Figure 1:
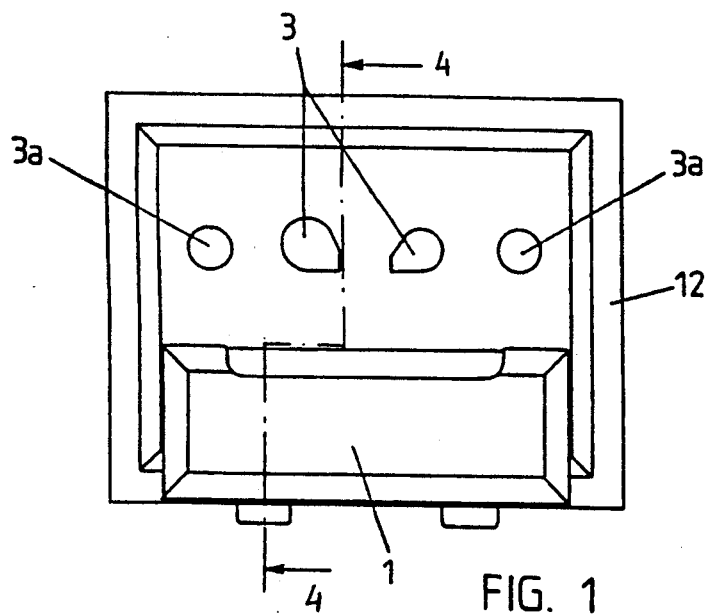

United States Patent [19]

Luotsinen et al.

[11] Patent Number: 5,246,293
[45] Date of Patent: Sep. 21, 1993

[54] REFERENCE JUNCTION FOR THERMOCOUPLE MEASURING

[75] Inventors: Osmo Luotsinen; Jorma Savolainen, both of Pietarsaari; Markku Laitinen, Takkakoski, all of Finland

[73] Assignee: Oy Beamex AB, Pietarsaari, Finland

[21] Appl. No.: 838,555

[22] Filed: Feb. 19, 1992

[30] Foreign Application Priority Data

Mar. 19, 1991 [FI] Finland ................. 911333

[51] Int. Cl.[5] .................. H01K 7/10; H01L 35/10
[52] U.S. Cl. ................... 374/181; 136/235; 374/208
[58] Field of Search ............ 374/180, 181, 208, 179

[56] References Cited

U.S. PATENT DOCUMENTS

| | | | |
|---|---|---|---|
| 3,939,012 | 2/1976 | Williams | 374/181 X |
| 4,483,632 | 11/1984 | Dewey et al. | 374/182 |
| 4,679,949 | 7/1987 | Sakamoto | 374/208 |
| 4,776,706 | 10/1988 | Loiterman et al. | |

FOREIGN PATENT DOCUMENTS 2187051A 8/1987 United Kingdom .

Primary Examiner—Daniel M. Yasich
Attorney, Agent, or Firm—Fitch, Even, Tabin & Flannery

[57] ABSTRACT

The invention relates to a reference junction for thermocouple measuring, comprising two reference temperature blocks (5) connected with one another heat conductively but dielectrically, one block for each thermocouple conductor and each block provided with a contact surface (4) for receiving the thermocouple conductor, and means (1) for retaining the thermocouple conductors or their attached contacts in contact with the contact surfaces (4) of the respective reference temperature blocks (5). To enable rapid fixing and detachment of the thermocouple conductors or their attached contacts, the means for retaining the thermocouple conductors in contact with their contact surfaces (4) comprise a single unitary retention block (1) pressed by spring-biased action against the contact surfaces.

16 Claims, 2 Drawing Sheets

REFERENCE JUNCTION FOR THERMOCOUPLE MEASURING

The present invention relates to a reference junction for thermocouple measuring, comprising two reference temperature blocks connected with one another heat conductively but dielectrically, one block for each thermocouple conductor and each block provided with a contact surface for receiving the thermocouple conductor, and means for retaining the thermocouple conductors or their attached contacts in contact with the contact surfaces of the respective reference temperature blocks.

As is generally known, a reference junction is used in connection with thermocouples that comprises two reference temperature blocks of as high temperature uniformity as possible, the temperature of said blocks being also precisely known. In this way, the temperature existing at the so called hot end of the thermocouple can be calculated using both the potential difference between the thermocouple conductors and the accurate temperature of the reference temperature blocks as a basis. Reference junctions of this kind for thermocouple measuring and the principle of the actual measuring have been described in U.S. Pat. No. 4,776,706 and British published application 2 187 051.

The general object of the present invention is to provide an optimum reference junction for use in thermocouple measuring. Thus the aim for the construction of the reference junction has been that the junction should have as good a heat construction as possible and be easy to use. In view of the ease of use, a solution has been aimed at that would be as far as possible suitable for use in rapid-pace measuring and calibration work on thermocouples in workshop, field, and laboratory conditions. Specifically in view of such rapid-pace fixing and detachment of thermocouple conductors or their attached contacts, the solutions known from the references have proved to be inconvenient in use.

The above problem can be solved with the reference junction of the invention, which is characterized in that the means for retaining the thermocouple conductors in contact with their contact surfaces comprise a single unitary retention block pressed by spring-biased action against the contact surfaces. When such a single unitary retention block is used, both thermocouple conductors or their attached contacts can be pushed simultaneously in place between the retention block and their contact surfaces, but the construction also allows a method of application in which the thermocouple conductors are individually fitted between the retention block and their contact surfaces.

The retention block preferably comprises a separate friction surface for each thermocouple conductor or its attached contact. Such a separate plastic, rubber, ceramic, or metallic friction surface affords good wear resistance and simultaneously secures the retention of the thermocouple conductor or its attached contact in place between the retention block and the contact surface for the conductor.

When the reference junction for thermocouple measuring comprises a housing encasing the reference temperature blocks and provided with apertures aligned with the contact surfaces of the reference temperature blocks for the inlet of the thermocouple conductors or their attached contacts, it is preferred that the retention block is adapted to close the inlet apertures when no thermocouple conductors are connected to the reference junction. In this way, the junction surfaces of the reference temperature blocks are prevented from getting dirty and the surfaces of the blocks are not exposed to currents of air or to heat or cold radiation through the inlet apertures.

Figure 2:
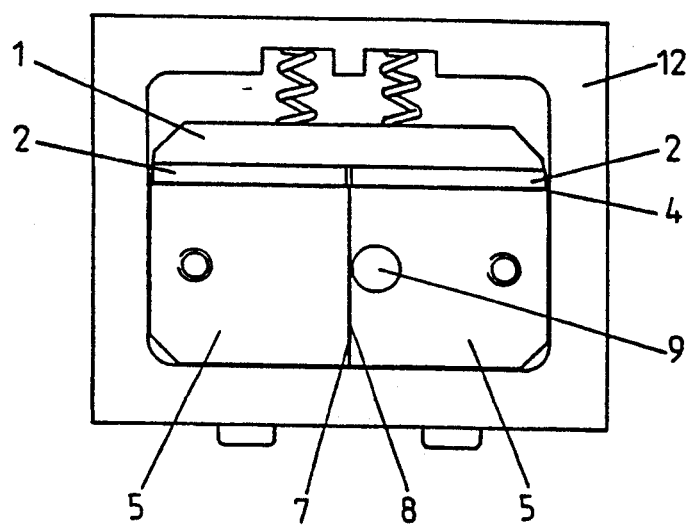
Figure 3:
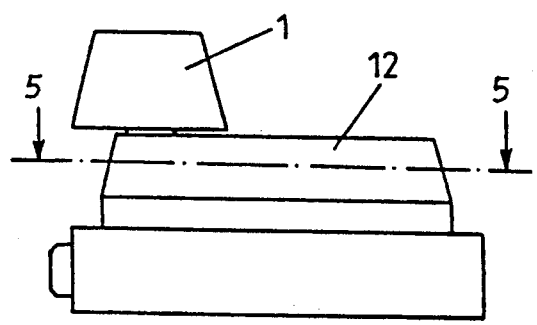
Figure 4:
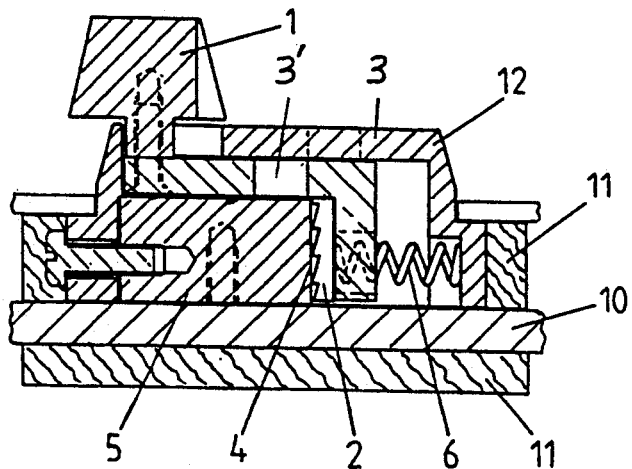
Figure 5:
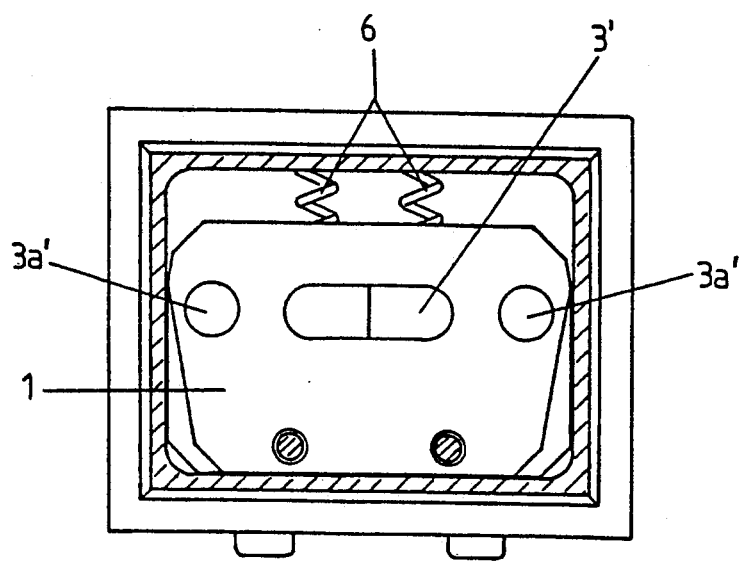

In the following, the reference junction for thermocouple measuring according to the invention is described in more detail with reference to the accompanying drawing, wherein FIG. 1 is a top view of a reference junction according to the invention, FIG. 2 is a bottom view of the reference junction of FIG. 1, FIG. 3 is a side view of the reference junction of FIG. 1, FIG. 4 is a cross-sectional view of the reference junction of FIG. 1 taken along lines 4—4 of FIG. 1, and FIG. 5 is a cross-sectional view of the reference junction of FIG. 1 taken along the lines 5—5 of FIG. 3.

The reference junction of the invention illustrated in the figures comprises two reference temperature blocks 5 connected with one another heat conductively but dielectrically. In the reference junction of the invention, the reference temperature blocks 5 have been joined together with a thin adhesive layer 7, which affords a good thermal conductivity between the blocks. An accurate dielectric gap is achieved by means of a nonconductive insulating cloth or porous paper 8. By this method, the blocks 5 are faster and less expensive to join together than by means of the conventionally used dielectric and highly heat-conductive materials, such as beryllium which must be soldered onto the reference temperature blocks typically with silver, or by means of a crimped joint and a dielectric insulating sheet.

The reference temperature blocks 5 have surfaces 4 against which the thermocouple conductors or their attached contacts are to be pressed for achieving both an electrical and a thermal contact. For this purpose, the reference junction comprises a retention block 1 having separate friction surfaces 2 in the section of the retention block facing these contact surfaces 4. The retention block 1 is spring-biased against said contact surfaces 4 by means of springs 6. The friction surfaces 2 of the retention block may be of plastic, rubber, ceramic, or metal, specifically in view of achieving a better wear resistance. Furthermore, these surfaces can be grooved or roughened to achieve a higher junction friction, as is shown in FIG. 4. If necessary, a material of a low thermal capacity and/or a heat-insulating material can be used as the material for the friction surface 2. The actual retention block must be of a dielectric material, such as plastic. As shown in FIG. 2, the retention block 1 has a separate friction surface 2 for each of the reference temperature blocks 5. Thus, these friction surfaces are not able to short circuit the reference temperature blocks 5 even though the friction surfaces are of a conductive material, as long as the actual retention block is of a dielectric material, such as plastic.

The mobile retention block 1 is spring-biased against the contact surfaces 4 of the reference temperature blocks 5 by means of two helical springs 6. These springs 6 are located so as to face the respective contact surface 4 of the reference temperature block 5 in each case. The reference temperature blocks 5 and the retention block 1 are substantially encased by a housing 12 extending over the top and to the sides of these parts. The reference junction is intended to be installed and connected electrically to a printed circuit 10, in which situation said printed circuit closes the underpart of the construction, as is shown in FIG. 4. In addition, the reference junction can be enclosed from beneath and at the sides by heat insulating elements 11, as can also be seen from FIG. 4. By this means, the temperature uniformity of the reference temperature blocks 5 is improved.

The housing 12 has apertures 3 for standard contacts for the thermocouples, and apertures 3a for the thermocouple conductors. As is apparent from FIGS. 1 and 4, these apertures are aligned with the contact surfaces 4 of the reference temperature blocks 5. FIG. 4 also shows that when there is/are no thermocouple contact or thermocouple conductors connected to the reference junction, the retention block 1 closes the apertures 3 and 3a of the housing 12. In this way, the junction surfaces 4 of the reference temperature blocks 5 are prevented from getting dirty and the surfaces of the blocks are not exposed to currents of air and to heat and cold radiation through said apertures 3 and 3a. When the retention block 1 is pushed against its springs 6 to detach the friction surface 2 and the contact surface 4 from one another to such an extent that the thermocouple conductors or the thermocouple contact can be pushed in between, the apertures 3' and 3a' provided in the retention block 1 (FIG. 5) are simultaneously moved to the location of the apertures 3 and 3a provided in the housing 12, thus opening a connection from the exterior of the housing 12 into the spaces between the friction surfaces 2 and the contact surfaces 4.

The placing of the springs 6 biasing the mobile retention block 1 is such as to allow attachment of a thermocouple contact in place through apertures 3 or of both thermocouple conductors through apertures 3a simultaneously, as the mobile retention block 1 is pushed at the midpoint. If, on the other hand, the mobile retention block is pushed at the end, only one aperture 3a for a thermocouple conductor is opened for the fixing or detachment of such a conductor, the other thermocouple conductor being retained in place pressed between the retention block 1 and the contact surface 4 for said conductor.

As can be seen from FIG. 2, an accurate reference temperature detector 9 is provided in the vicinity of the interface 7 of the reference temperature blocks 5, in order that the temperature of the reference temperature blocks may be measured as accurately as possible. This reference temperature detector 9 could also be located in the interface 7 between the blocks 5.

In the foregoing, the reference junction for thermocouple measuring according to the invention has been described only by way of an exemplifying constructional embodiment, and it will be appreciated that some constructional modifications may be made therein without departing from the scope defined by the appended claims.

We claim:

1. A reference junction for thermocouple measuring, comprising two reference temperature blocks (5) connected with one another heat conductively but dielectrically, one block for each thermocouple conductor and each block provided with a contact surface (4) for receiving the thermocouple conductor, and means (1) for retaining the thermocouple conductors in contact with the contact surfaces (4) of the respective reference temperature blocks (5), characterized in that the means for retaining the thermocouple conductors in contact with their contact surfaces (4) comprise a single unitary retention block (1) housed in a housing (12) and pressed against the contact surface by spring-biased action opposing said housing.

2. A reference junction for thermocouple measuring in accordance with claim 1, characterized in that the retention block (1) comprises a portion adapted to slide between the reference temperature blocks (5) and the housing (12) and is provided with apertures (3', 3a') corresponding to the inlet apertures (3, 3a) of the housing (12).

3. A reference junction for thermocouple measuring in accordance with claim 1, characterized in that the retention block (1) comprises a separate friction surface (2) for each thermocouple conductor.

4. A reference junction for thermocouple measuring in accordance with claim 3, wherein said housing (12) encases the reference temperature blocks (5), said housing being provided with apertures (3, 3a) aligned with the contact surfaces (4) of the temperature reference blocks (5) for the inlet of the thermocouple conductors, characterized in that the retention block (1) is adapted to close the inlet apertures when no thermocouple conductors are connected to the reference junction.

5. A reference junction for thermocouple measuring in accordance with claim 4, characterized in that the retention block (1) comprises a portion adapted t slide between the reference temperature blocks (5) and the housing (12) and is provided with apertures (3', 3a') corresponding to the inlet apertures (3, 3a) of the housing (12).

6. A reference junction for thermocouple measuring in accordance with claim 3, characterized in that the retention block (1) is spring-biased by means of two springs (6) located opposite the respective contact surface (4) of the reference temperature block (5) in each case.

7. A reference junction for thermocouple measuring in accordance with claim 6, characterized in that the retention block (1) comprises a portion adapted to slide between the reference temperature blocks (5) and the housing (12) and is provided with apertures (3', 3a') corresponding to the inlet apertures (3, 3a) of the housing (12).

8. A reference junction for thermocouple measuring in accordance with claim 6, wherein said housing (12) encases the references temperature blocks (5), said housing being provided with apertures (3, 3a) aligned with the contact surfaces (4) of the temperature reference blocks (5) for the inlet of the thermocouple conductors, characterized in that the retention block (1) is adapted to close the inlet apertures when no thermocouple conductors are connected to the reference junction.

9. A reference junction for thermocouple measuring in accordance with claim 8, characterized in that the retention block (1) comprises a portion adapted to slide between the reference temperature blocks (5) and the housing (12) and is provided with apertures (3', 3a') corresponding to the inlet apertures (3, 3a) of the housing (12).

10. A reference junction for thermocouple measuring in accordance with claim 3, characterized in that the retention block (1) comprises a portion adapted to slide between the reference temperature blocks (5) and the housing (12) and is provided with apertures (3', 3a') corresponding to the inlet apertures (3, 3a) of the housing (12).

11. A reference junction for thermocouple measuring in accordance with claim 1, wherein said housing (12) encases the reference temperature blocks (5), said housing being provided with apertures (3, 3a) aligned with the contact surfaces (4) of the temperature reference blocks (5) for the inlet of the thermocouple conductors, characterized in that the retention block (1) is adapted to close the inlet apertures when no thermocouple conductors are connected to the reference junction.

12. A reference junction for thermocouple measuring in accordance with claim 11, characterized in that the retention block (1) comprises a portion adapted to slide between the reference temperature blocks (5) and the housing (12) and is provided with apertures (3', 3a') corresponding to the inlet apertures (3, 3a) of the housing (12).

13. A reference junction for thermocouple measuring in accordance with claim 1, characterized in that the retention block (1) is spring-biased by means of two springs (6) located opposite the respective contact surface (4) of the reference temperature block (5) in each case.

14. A reference junction for thermocouple measuring in accordance with claim 13 wherein said housing (12) encases the reference temperature blocks (5), said housing being provided with apertures (3, 3a) aligned with the contact surfaces (4) of the temperature references blocks (5) for the inlet of the thermocouple conductors, characterized in that the retention block 91) is adapted to close the inlet apertures when no thermocouple conductors are connected to the reference junction.

15. A reference junction for thermocouple measuring in accordance with claim 14, characterized in that the retention block (1) comprises a portion adapted to slide between the reference temperature blocks (5) and the housing (12) and is provided with apertures (3', 3a') corresponding to the inlet apertures (3, 3a) of the housing (12).

16. A reference junction for thermocouple measuring in accordance with claim 13, characterized in that the retention block (1) comprises a portion adapted to slide between the reference temperature blocks (5) and the housing (12) and is provided with apertures (3a, 3a') corresponding to the inlet apertures (3, 3a) of the housing (12).

* * * * *

UNITED STATES PATENT AND TRADEMARK OFFICE
CERTIFICATE OF CORRECTION

PATENT NO. : 5,246,293

DATED : September 21, 1993

INVENTOR(S) : Luotsinen, et al.

It is certified that error appears in the above-identified patent and that said Letters Patent is hereby corrected as shown below:

ON THE TITLE PAGE:

[75] Inventors: Change "Takkakoski" to --Tikkakoski--.

Column 4, line 27, change "t slide" to --to slide--.

Column 4, line 47, change "references" to --reference--.

Column 6, line 7, change "91)" to --(1)--.

Signed and Sealed this

Fifth Day of April, 1994

Attest:

BRUCE LEHMAN

Attesting Officer

Commissioner of Patents and Trademarks